United States Patent
Bhattad et al.

(10) Patent No.: US 8,195,099 B2
(45) Date of Patent: Jun. 5, 2012

(54) SPEED ESTIMATION AND POWER CONTROL BASED ON CQI REPORTS

(75) Inventors: Kapil Bhattad, San Diego, CA (US);
Ravi Palanki, San Diego, CA (US);
Alexei Gorokhov, San Diego, CA (US);
Arnab Das, Bethesda, MD (US)

(73) Assignee: QUALCOMM Incorporated, San Diego, CA (US)

( * ) Notice: Subject to any disclaimer, the term of this patent is extended or adjusted under 35 U.S.C. 154(b) by 890 days.

(21) Appl. No.: 12/259,554

(22) Filed: Oct. 28, 2008

(65) Prior Publication Data
US 2009/0170437 A1 Jul. 2, 2009

Related U.S. Application Data

(60) Provisional application No. 61/017,516, filed on Dec. 28, 2007.

(51) Int. Cl.
*H04B 7/00* (2006.01)
(52) U.S. Cl. ..... 455/69; 455/522; 455/452.2; 455/67.11
(58) Field of Classification Search ............ 455/522, 455/69, 450, 452.1, 452.2, 9, 10, 507, 517, 455/67.11, 24, 67.13
See application file for complete search history.

(56) References Cited

U.S. PATENT DOCUMENTS

| 2004/0248606 | A1 | 12/2004 | Suzuki et al. |
| 2005/0277422 | A1* | 12/2005 | Baker et al. ............. 455/450 |
| 2006/0099985 | A1* | 5/2006 | Whinnett et al. ......... 455/522 |
| 2008/0039145 | A1* | 2/2008 | Ishii et al. .............. 455/561 |

FOREIGN PATENT DOCUMENTS

| EP | 1351424 A2 | 10/2003 |
| EP | 1592139 A2 | 11/2005 |
| WO | WO2004004173 | 1/2004 |
| WO | WO2007136337 | 11/2007 |

OTHER PUBLICATIONS

International Search Report & Written Opinion—PCT/US2009/087974, International Search Authority—European Patent Office—Nov. 17, 2009.

* cited by examiner

*Primary Examiner* — John J Lee
(74) *Attorney, Agent, or Firm* — Donald C. Kordich

(57) ABSTRACT

Systems and methodologies are described that facilitate utilizing different power control algorithms as a function of access terminal speed. For instance, instantaneous Channel Quality Indicator (CQI) reports can be inverted for slow moving access terminals while long-term geometry inversion (e.g., average CQI report inversion) can be utilized for quick moving access terminals. Speed of the access terminal can be estimated based upon time correlation of CQI values. Further, selection of implementing instantaneous CQI inversion or long-term geometry inversion can be based upon the estimated speed of the access terminal.

50 Claims, 11 Drawing Sheets

SPEED ESTIMATION AND POWER CONTROL BASED ON CQI REPORTS

CROSS-REFERENCE TO RELATED APPLICATIONS

This application claims the benefit of U.S. Provisional Patent application Ser. No. 61/017,516 entitled "SPEED ESTIMATION AND POWER CONTROL BASED ON CQI REPORTS" which was filed Dec. 28, 2007. The entirety of the aforementioned application is herein incorporated by reference.

BACKGROUND

I. Field

The following description relates generally to wireless communications, and more particularly to utilizing an estimate of speed of an access terminal to control power in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

Transmission of signals over a wireless channel can cause alterations of such signals. For instance, a signal can be transmitted at a first power level and received at a disparate, second power level. The transmit power can be controlled based upon knowledge of the channel (e.g., gain, loss, channel conditions, interference, . . . ) such that receive power is at a desired level. By way of illustration, a base station can control the power level of a transmitted signal to enable an access terminal to receive that signal at a desired power level, thereby allowing the access terminal to further process, store, utilize, etc. a message conveyed by the signal. However, since it is not possible to know the channel state perfectly at any given time, power control is performed based on prior estimates of link quality. Conventional techniques for controlling power at a base station, however, typically fail to account for speed of an access terminal (e.g., which dictates how fast the channel has changed since the last estimate); rather, a common power control algorithm is oftentimes employed for access terminals traversing at different speeds, which can be suboptimal since such scenario leads to designing for worst-case channel conditions.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating utilization of different power control algorithms as a function of access terminal speed. For instance, instantaneous Channel Quality Indicator (CQI) reports can be inverted for slow moving access terminals while long-term geometry inversion (e.g., average CQI report inversion) can be utilized for quick moving access terminals. Speed of the access terminal can be estimated based upon time correlation of CQI values. Further, selection of implementing instantaneous CQI inversion or long-term geometry inversion can be based upon the estimated speed of the access terminal.

According to related aspects, a method that facilitates controlling power in a wireless communication environment is described herein. The method can include receiving a Channel Quality Indicator (CQI) report from an access terminal. Further, the method can comprise estimating a speed of the access terminal. Moreover, the method can include selecting a power level for transmission based upon the estimated speed of the access terminal and at least the CQI report.

Another aspect relates to a wireless communications apparatus. The wireless communications apparatus can include a memory that retains instructions related to obtaining Channel Quality Indicator (CQI) report from an access terminal, estimating a speed of the access terminal, and selecting a power level for transmission based upon the estimated speed of the access terminal and at least the CQI report. Further, the wireless communications apparatus can include a processor, coupled to the memory, configured to execute the instructions retained in the memory.

Yet another aspect relates to a wireless communications apparatus that enables controlling power based upon considerations of access terminal speed in a wireless communication environment. The wireless communications apparatus can include means for obtaining a CQI report from an access terminal. Moreover, the wireless communications apparatus can include means for estimating a speed of the access terminal. Further, the wireless communications apparatus can include means for identifying a power level for transmission to the access terminal based upon the estimated speed and at least the CQI report.

Still another aspect relates to a computer program product that can comprise a computer-readable medium. The computer-readable medium can include code for receiving a Channel Quality Indicator (CQI) report from an access terminal. Further, the computer-readable medium can include code for estimating a speed of the access terminal. Moreover, the computer-readable medium can comprise code for selecting a power level for transmission based upon the estimated speed of the access terminal and at least the CQI report.

In accordance with another aspect, an apparatus in a wireless communication system can include a processor, wherein the processor can be configured to obtain a CQI report from an access terminal. Moreover, the processor can be configured to estimate a speed of the access terminal based upon a time correlation of the CQI report with at least one previously received CQI report from the access terminal. Further, the processor can be configured to select a power level for transmission to the access terminal based upon the estimated speed and at least the CQI report.

According to other aspects, a method that facilitates reporting CQI values as a function of estimated speed in a wireless communication environment is described herein. The method can include determining an instantaneous CQI report based upon an evaluation of a pilot obtained from a base station at an access terminal. Further, the method can include averaging the instantaneous CQI report with at least one previously determined instantaneous CQI report to yield an average CQI report. Moreover, the method can comprise estimating a speed of the access terminal at the access terminal based upon a time correlation of the instantaneous CQI report with one or more of the at least one previously determined instantaneous CQI report. The method can also include transmitting one of the instantaneous CQI report or the average CQI report to the base station based upon the estimated speed for utilization in connection with power control.

Yet another aspect relates to a wireless communications apparatus that can include a memory that retains instructions related to determining an instantaneous CQI report based upon an evaluation of a pilot obtained from a base station at an access terminal, averaging the instantaneous CQI report with at least one previously determined instantaneous CQI report to yield an average CQI report, estimating a speed of the access terminal at the access terminal based upon a time correlation of the instantaneous CQI report with one or more of the at least one previously determined instantaneous CQI report, and transmitting one of the instantaneous CQI report or the average CQI report to the base station based upon the estimated speed for utilization in connection with power control. Further, the wireless communications apparatus can comprise a processor, coupled to the memory, configured to execute the instructions retained in the memory.

Another aspect relates to a wireless communications apparatus that enables selecting a CQI report to send to a base station as a function of access terminal speed for utilization in connection with power control in a wireless communication environment. The wireless communications apparatus can include means for generating an instantaneous CQI report. Moreover, the wireless communications apparatus can include means for averaging the instantaneous CQI report with at least one previously generated instantaneous CQI report to yield an average CQI report. Further, the wireless communications apparatus can comprise means for estimating a speed based upon a time correlation of the instantaneous CQI report with one or more of the at least one previously generated instantaneous CQI report. The wireless communications apparatus can additionally include means for transmitting one of the instantaneous CQI report or the average CQI report to a base station based upon the estimated speed.

Still another aspect relates to a computer program product that can comprise a computer-readable medium. The computer-readable medium can include code for generating an instantaneous CQI report. Further, the computer-readable medium can include code for averaging the instantaneous CQI report with at least one previously generated instantaneous CQI report to yield an average CQI report. The computer-readable medium can also include code for estimating a speed based upon a time correlation of the instantaneous CQI report with one or more of the at least one previously generated instantaneous CQI report. Moreover, the computer-readable medium can include code for transmitting one of the instantaneous CQI report or the average CQI report to a base station based upon the estimated speed.

In accordance with another aspect, an apparatus in a wireless communication system can include a processor, wherein the processor can be configured to determine an instantaneous CQI report based upon an evaluation of a pilot obtained from a base station at an access terminal. Further, the processor can be configured to average the instantaneous CQI report with at least one previously determined instantaneous CQI report to yield an average CQI report. Moreover, the processor can be configured to estimate a speed of the access terminal at the access terminal based upon a time correlation of the instantaneous CQI report with one or more of the at least one previously determined instantaneous CQI report. The processor can also be configured to transmit one of the instantaneous CQI report or the average CQI report to the base station based upon the estimated speed for utilization in connection with power control.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
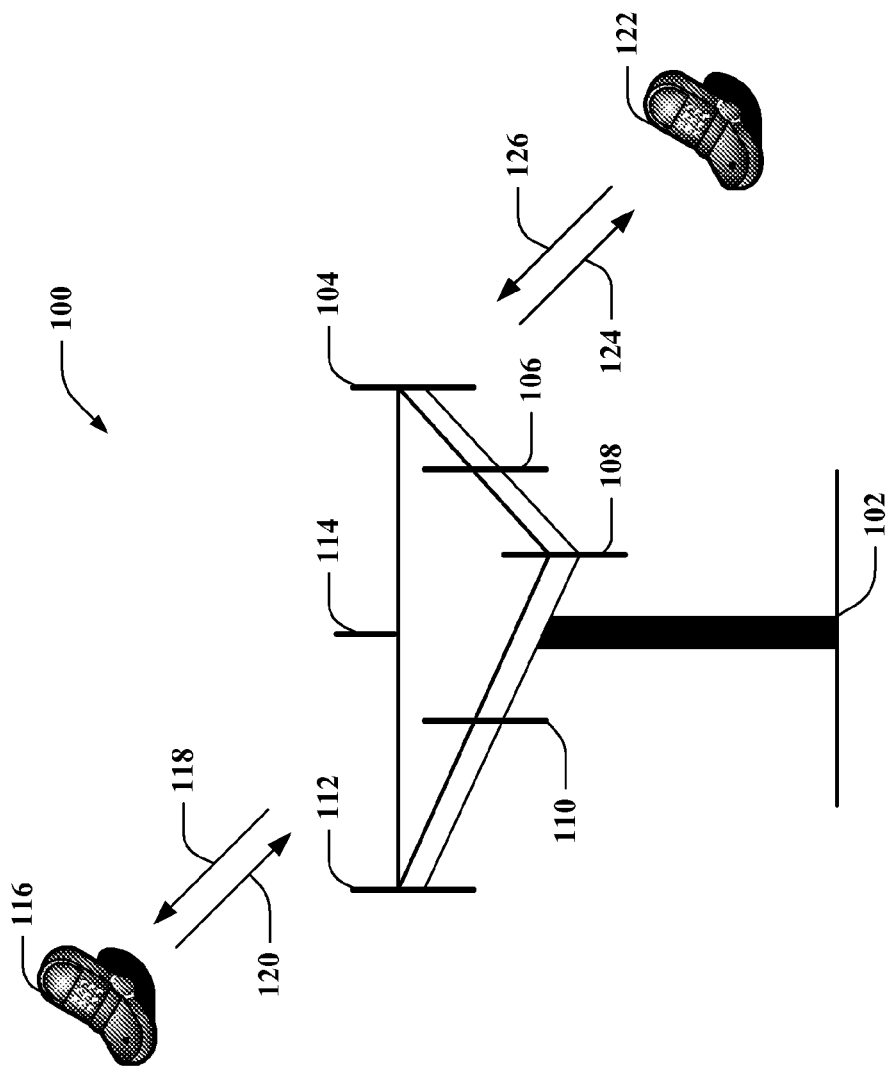
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

System 100 utilizes different power control algorithms corresponding to disparate speeds at which an access terminal is moving. According to an example, access terminal 116 can be moving at a high rate of speed and access terminal 122 can be slowly moving or stationary. Both access terminals 116, 122 can send Channel Quality Indicator (CQI) reports to base station 102, where these CQI reports can provide a measurement of channel quality. Base station 102 yields an estimate of the access terminal speed based on time correlation of received CQI values. Thereafter, base station 102 can perform power control by either effectuating instantaneous CQI inversion (e.g., for slowly moving access terminals such as access terminal 122 in the aforementioned example, for pedestrian users, . . . ) or long-term geometry inversion (e.g., for quickly moving access terminals such as access terminal 116 in the aforementioned example, vehicular users, . . . ). Thus, rather than using one power control algorithm for access terminals at different speeds, which can be suboptimal since it leads to designing for the worst-case channel condition, system 100 enables determining a speed of an access terminal (e.g., based upon time correlation of CQI values, . . . ) and then utilizing an appropriate power control technique that is selected as a function of the determined speed of the access terminal. It is to be appreciated, however, that the claimed subject matter is not limited to the aforementioned example. Further, system 100 can enable leveraging mobility estimation for beneficially controlling power of control channels; yet, it is contemplated that any type of channel (e.g., not limited to control channels, can be power controlled by employing techniques described herein.

Figure 2:
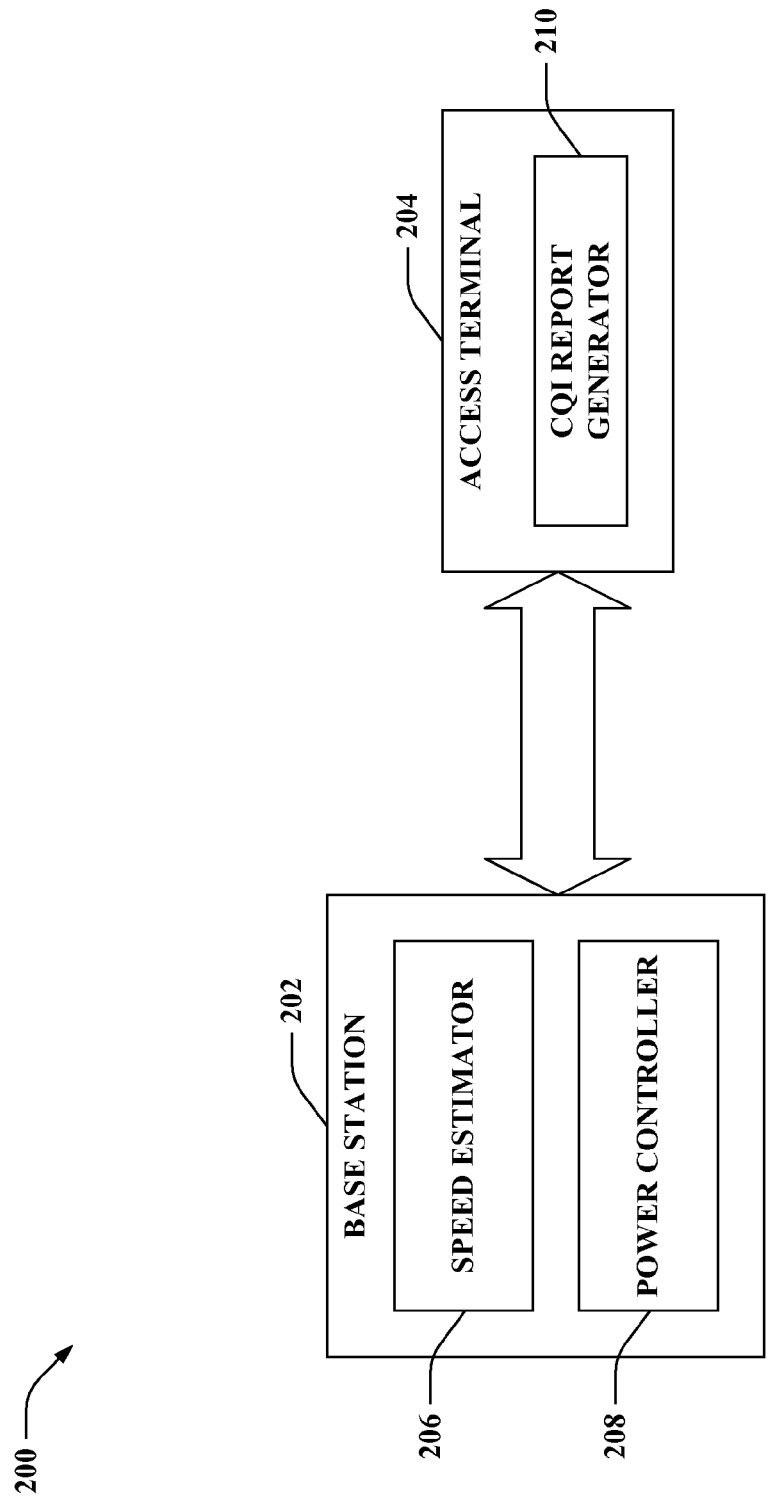
FIG. 2 is an illustration of an example system that estimates access terminal speed and controls transmit power as a function of the estimated speed in a wireless communication environment.

Now referring to FIG. 2, illustrated is a system 200 that estimates access terminal speed and controls transmit power as a function of the estimated speed in a wireless communication environment. System 200 includes a base station 202 that can transmit and/or receive information, signals, data, instructions, commands, bits, symbols, and the like. Base station 202 can communicate with an access terminal 204 via the forward link and/or reverse link. Access terminal 204 can transmit and/or receive information, signals, data, instructions, commands, bits, symbols, and the like. Moreover, although not shown, it is contemplated that any number of base stations similar to base station 202 can be included in system 200 and/or any number of access terminals similar to access terminal 204 can be included in system 200.

Base station 202 can further include a speed estimator 206 and a power controller 208. Speed estimator 206 can determine a speed of access terminal 204 (and/or respective speeds of any disparate access terminals (not shown)). For example, speed estimator 206 can differentiate movement of access terminal 204 as falling into one of two possible estimated speeds; thus, following this example, speed estimator 206 can identify whether access terminal 204 is moving quickly or slowly. It is to be appreciated, however, that the claimed subject matter is not limited to use of two possible estimated speeds that can be identified by speed estimator 206; rather, any number of possible estimated speeds can be employed by speed estimator 206. Further, power controller 208 can utilize the estimated speed of access terminal 204 to regulate transmit power utilized for a subsequent forward link transmission. For instance, power controller 208 can control power of control channels; however, the claimed subject matter is not so limited as it is contemplated that power used in association with non-control channels can be regulated by power controller 208.

Access terminal 204 can further include a CQI report generator 210 that yields CQI reports that provide information related to channel quality. CQI report generator 210 can yield the CQI reports with substantially any periodicity. Alternatively, CQI report generator 210 can nonperiodically yield CQI reports. Further, access terminal 204 can send the CQI reports obtained via employing CQI report generator 210 to base station 202, which can utilize the CQI reports to estimate the speed of access terminal 204 and thereafter control transmit power for sending forward link transmission(s).

The channel as measured by CQI report generator 210 can change quickly or slowly depending on the speed of access terminal 204. According to an example, when access terminal 204 is moving slowly or is stationary, CQI values reported by access terminal 204 as yielded by CQI report generator 210 can change slowly, if at all, over time. Thus, pursuant to this example, speed estimator 206 can recognize that the CQI values are changing slowly over time, and therefore, a CQI report obtained by base station 202 at a first time period can be used by power controller 208 to select a transmit power to employ for a next time period. Power controller 208 can compensate for channel conditions identified from the CQI reports by performing channel inversion to select a transmit power when access terminal 204 is determined to be moving slowly. Moreover, when access terminal 204 is slowly moving, channel inversion (e.g., instantaneous CQI inversion, . . . ) can be performed by power controller 208 while adding an additional backoff, where this additional backoff can be used to compensate for quantization error of a CQI report, measurement error of a CQI report and/or small changes in channel conditions since a last CQI report.

By way of further example, when access terminal 204 is moving fast, CQI values reported by access terminal 204 can change quickly over time. Hence, speed estimator 206 can recognize the fast changes of the channel leading to a disparate metric being used by power controller 208 under such conditions (e.g., when access terminal 204 is determined to be fast moving by speed estimator 206 based upon an evaluation of obtained CQI reports, . . . ). Under such scenario, power controller 208 can perform channel inversion while adding an additional backoff. When the channel is changing fast, an average power received at access terminal 204 over a period of time can be determined by power controller 208. Power controller 208 can leverage the average power received at access terminal 204 to determine an average loss of the channel. Further, power controller 208 can perform channel inversion by employing the average loss; thus, the total receive power at access terminal 204 on average is close to the desired power with fluctuation (e.g., fast fade, . . . ). To compensate for the fluctuation, the additional backoff can be added to the transmit power by power controller 208 when access terminal 204 is determined to be moving quickly by speed estimator 206.

The backoff can be used by power controller 208 to provide acceptable performance when access terminal 204 is identified to be moving quickly. When channel inversion is effectuated based on an average, the signal received at access terminal 204 can be a desired power plus or minus a variation (e.g., fluctuation, . . . ). The backoff can be added to compensate for the variation. Thus, when power controller 208 incorporates the backoff into the transmitted signal, access terminal 204 can obtain a signal at a desired power level plus the backoff plus the variation. Performance of system 200 can be detrimentally impacted if a received power level is below a target power level, while a deleterious impact may not be experienced when the received power level is above the target power level. Accordingly, the backoff added by power controller 208 can increase the received power level to mitigate such received power level falling below the target power level due to the aforementioned variation. Similar considerations can be used to select the backoff for the case when channel inversion is effectuated based on instantaneous CQI reports (e.g. when access terminal 204 is determined to be slowly moving, . . . ). However, backoffs respectively used for slow speeds and fast speeds can differ. According to another example, it is contemplated that the backoffs used for slow speeds and/or fast speeds can be defined as a function of a measured correlation (e.g., time correlation of CQI reports, . . . ). Following this example, the function can potentially be decreasing and/or increasing, different functions can be used to yield the backoffs for slow speeds versus fast speeds, and so forth. It is to be appreciated, however, that the claimed subject matter is not limited to the aforementioned example.

By way of example, power controller 208 can select the backoff based upon an error requirement. For instance, a probability of error can decrease as the backoff is increased. Hence, a smallest backoff value that yields a required probability of error can be chosen by power controller 208; however, the claimed subject matter is not so limited.

System 200 enables utilizing a determined access terminal speed when controlling forward link transmit power. For example, speed estimator 206 of base station 202 can determine whether access terminal 204 is moving slowly or quickly. If there is little variation in the CQI reports received at base station 202 from access terminal 204 (e.g., yielded by CQI report generator 210, . . . ), then speed estimator 206 recognizes that access terminal 204 is moving slowly. In this case, power control is effectuated by power controller 208 through instantaneous channel inversion, where power controller 208 can select a power level it desires access terminal 204 to see and is able to work backwards to identify a transmit power level to employ. Further, a backoff can be added to this transmit power identified by the power controller 208. On the other hand, if speed estimator 206 determines that access terminal 204 is moving quickly based on large variations indicated in CQI reports over a short period of time, then power controller 208 can average CQI values over a period of time and perform channel inversion based on the average to yield the transmit power; moreover, a backoff can be added to such transmit power. The backoff utilized in connection with slow speeds can differ from the backoff employed in connection with fast speeds, for instance. It is to be appreciated, however, that the claimed subject matter is not limited to the aforementioned example.

Figure 3:
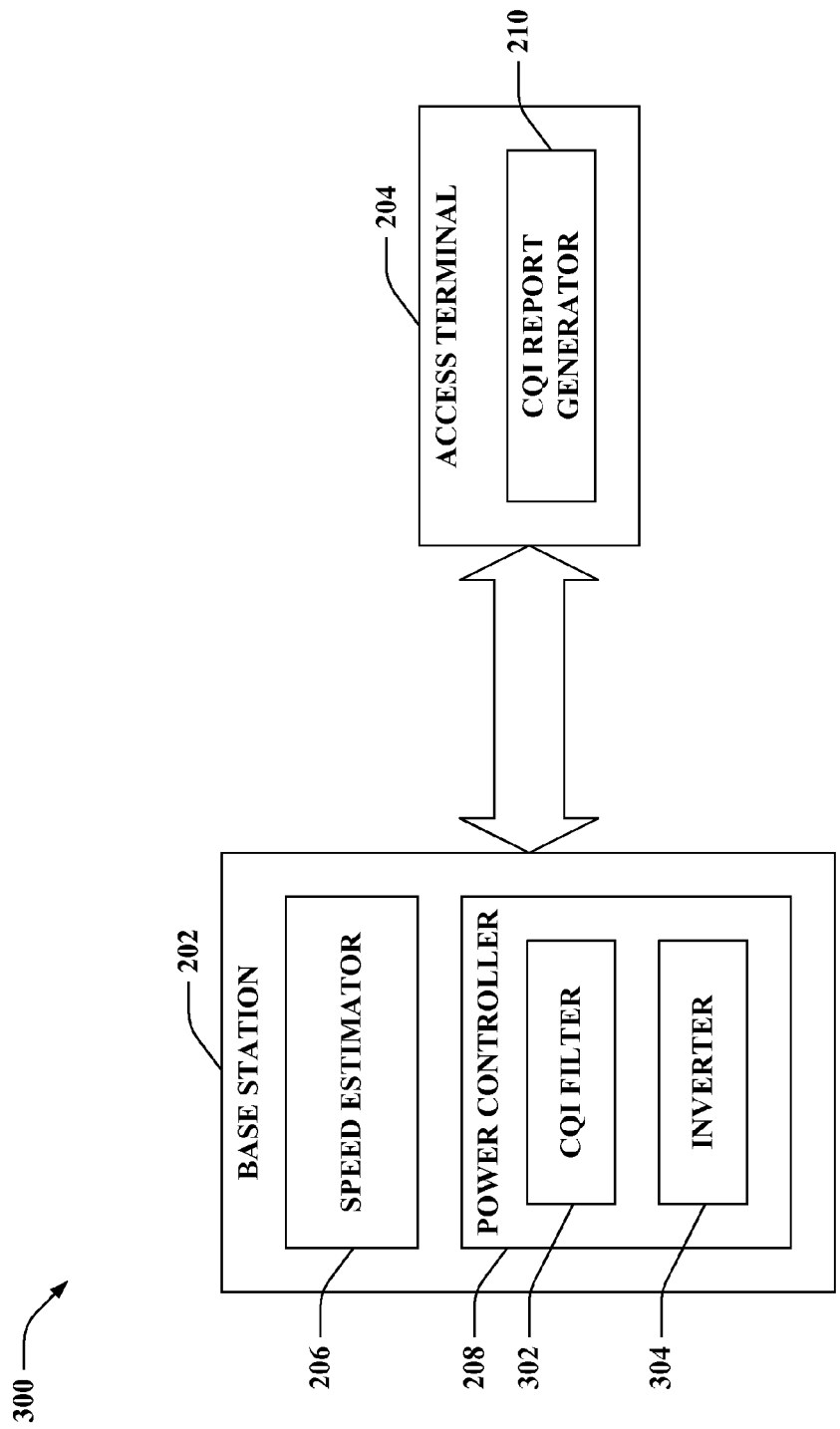
FIG. 3 is an illustration of an example system that effectuates CQI reporting and forward link power control in a wireless communication environment.

Turning to FIG. 3, illustrated is a system 300 that effectuates CQI reporting and forward link power control in a wireless communication environment. System 300 includes base station 202 and access terminal 204, yet it is contemplated that system 300 can include any additional number of base station(s) and/or access terminal(s). Base station 202 can further include speed estimator 206 and power controller 208, and access terminal 204 can further include CQI report generator 210. Moreover, power controller 208 of base station 202 can further include a CQI filter 302 and an inverter 304 as described below.

System 300 supports leveraging an algorithm described herein that effectuates CQI reporting at access terminal 204 (e.g., via employing CQI report generator 210, . . . ) and power control at base station 202 (e.g., via utilizing power controller 208, . . . ). Various reasons can support utilization of such algorithm. In particular, the reasons supporting the algorithm can be based upon comparison of average carrier (avgc) versus effective carrier (effC), comparison of avgC/average interference (avgI) versus avg(C/I) (e.g., which can elucidate effects of interference variations, . . . ), instantaneous CQI inversion versus long-term geometry inversion (e.g., including filtering length determination, . . . ), and impact on Forward Dedicated Channel (F-DCH) power control.

CQI report generator 210 of access terminal 204 can employ the following algorithm for CQI reporting. CQI report generator 210 can compute avgC/avgI for 1 frame in every 8 frames; thereafter, the yielded value of avgC/avgI can be reported to base station 202. For instance (e.g. in an Ultra Mobile Broadband (UMB) environment, . . . ), avgc can be computed using Forward CQI Pilot Channel (F-CQIPICH) and avgI can be computed over Forward Link Control Segment (FLCS) Dedicated Pilot Channel (F-DPICH) over 8 frames (e.g., assuming interference statistics are substantially similar on all interlaces, . . . ). Moreover, CQI report generator 210 can quantize the CQI report and send such report to base station 202 on Reverse CQI Channel (R-CQICH) (e.g., utilizing a quantization table, . . . ). Further, if a Reverse MIMO Channel Quality Indicator Channel (R-MQICH) is present, CQI report generator 210 can report effC/avgI on R-MQICH; however, the claimed subject matter is not so limited. Additionally, Forward Acknowledgement Channel (F-ACKCH)

and/or Forward Pilot Quality Indicator Channel (F-PQICH) can have power control effectuated thereupon as described herein, for instance. According to another illustration, system 300 can be utilized in a Long Term Evolution (LTE) environment. As such, common reference signals (CRS) can be utilized for channel and interference estimation rather than F-CQIPICH and F-DPICH as employed in UMB, power control can be effectuated upon LTE control channels (e.g., Physical Hybrid ARQ Indicator Channel (PHICH), Physical Downlink Control Channel (PDCCH), . . . ) rather than F-ACKCH and/or F-PQICH as employed for UMB, and appropriate formats of Physical Uplink Control Channel (PUCCH) can be used for CQI reports. Further, it is contemplated that CQI report generator 210 of access terminal 204 can nonperiodically generate and/or send CQI reports to base station 202.

CQI filter 302 can filter CQI reports obtained from access terminal 204. Although shown as being included in power controller 208, it is to be appreciated that CQI filter 302 can be at least partially separate from power controller 208, at least partially included in speed estimator 206, and so forth. According to an example, CQI filter 302 can be an infinite impulse response (IIR) filter; however, the claimed subject matter is not so limited. The IIR filter can utilize a coefficient $\alpha=0.1$ to compute a normalized correlation. Hence, the following can be yielded by such IIR filter:

Geometry$[n]=(1-\alpha)*$Geometry$[n-1]+\alpha*$CQI$[n]$

Corr$[n]=(1-\alpha)*$Corr$[n-1]+\alpha*$CQI$[n-1]$CQI$[n]$

Var$[n]=(1-\alpha)*$Var$[n-1]+\alpha*[$CQI$[n]]^2$

NormCorr$[n]=$Corr$[n]/$Var$[n]$

The aforementioned computations can assume CQI is in the linear domain. Further, in the above, n can denote a number (e.g., index, . . . ) of a received CQI report (e.g., within a sequence of received reports, . . . ), CQI[n] can denote the nth CQI report, and $\alpha$ can be a filtering constant.

Utilizing the above computations, power controller 208 can select a power level for base station 202 based on long-term geometry when NormCorr is less than a threshold. Further, power controller 208 can select a power level for base station 202 based on a latest non-erased CQI report when NormCorr is greater than the threshold. Employment of the latest non-erased CQI report can save power for slow moving access terminals (e.g. save power on pedestrian channels, . . . ). It is contemplated that the threshold value can be 0.9 (e.g., for both one receive antenna (1Rx) and two receive antennas (2Rx), . . . ) so that 3 kmph channels typically fall above the threshold; however, the claimed subject matter contemplates utilizing substantially any threshold, which can be predefined, adaptively determined, and the like.

Inverter 304 can effectuate instantaneous CQI inversion and/or long-term geometry inversion to select a transmit power to be employed by base station 202 for downlink transmissions to access terminal 204 based upon the speed estimation associated with access terminal 204. For instance, the power control can be for an acknowledgement (ACK) channel; however, the claimed subject matter is not so limited.

If NormCorr[n]>Threshold, then inverter 304 of base station 202 can choose power ($P_{TX-ACK}$) via evaluating the following (e.g., by employing instantaneous CQI inversion, . . . ): $P_{TX-ACK}$ (dB)=Backoff$_{SHORT-TERM}$+SNR$_{TARGET}$− 10*log 10(CQI[n]). More particularly, SNR$_{TARGET}$ (e.g., target signal to noise ratio, . . . ) is a FLCS-channel-type (e.g., Pilot Quality Indicator Channel (PQICH), ACK, . . . ) dependent quantity. For example, SNR$_{TARGET}$ can be equal to an SNR on additive white Gaussian noise (AWGN) 1Rx channel required to obtain a desired error rate. Further, Backoff$_{SHORT-TERM}$ can be used to compensate for the fact that the CQI report does not correspond to exact SNR seen on FLCS tiles. For instance, this can be due to mobility, hopping, quantization, etc. Backoff$_{SHORT-TERM}$ can take different values depending on the number of receive antennas. Further, dependence of Backoff$_{SHORT-TERM}$ on FLCS-channel-type is expected to be small. However, Backoff$_{SHORT-TERM}$+ SNR$_{TARGET}$ can be optimized jointly for different FLCS-channels to improve performance.

Further, if NormCorr[n]<Threshold, then inverter 304 of base station 202 can choose power ($P_{TX-ACK}$) via analyzing the following (e.g., by employing long-term geometry inversion): $P_{TX-ACK}$(dB)=Backoff$_{LONG-TERM}$+SNR$_{TARGET}$− 10*log 10(Geometry[n]). According to an example, geometry capping can be effectuated for high geometry users. Further, (Backoff$_{LONG-TERM}$+SNR$_{TARGET}$) can be a FLCS-channel-type (e.g., PQICH, ACK, . . . ) dependent quantity. For instance, (Backoff$_{LONG-TERM}$+SNR$_{TARGET}$) can be equal to the required SNR on a worst-case channel model (e.g., pedestrian channel, . . . ).

CQI filter 302 can filter CQI reports obtained from access terminal 204. According to an example, CQI filter 302 can be an IIR filter. Further, CQI filter 302 can filter the CQI reports pursuant to the following: CQI$_{FILTERED}$=$\alpha$CQI$_{ESTIMATED}$+ $(1-\alpha)$CQI$_{FILTERED}$, where $\alpha$ is a filtering constant. Moreover, a transmit power can be chosen based thereupon (e.g., by power controller 208, . . . ) according to the following: $P_{TX-ACK}$=SNR$_{TARGET}$−CQI$_{FILTERED}$+OFFSET By way of illustration, the filtering constant can be a function of the OFFSET being chosen for a particular model and speed and/ or the OFFSET being independent of speed and channel model.

Speed estimator 206 (and/or CQI filter 302) can estimate a speed at which the channel is changing. For example, at high speeds, the CQI reports can be uncorrelated with the channel realization; pursuant to this example, inverter 304 can optimally employ long-term geometry inversion. By way of another example, at low speeds, CQI reports can be highly correlated with a next channel realization; thus, inverter 304 can optimally employ instantaneous CQI inversion. The aforementioned correlation at access terminal 204 can be estimated using received CQI reports. Various metrics to estimate the correlation can be utilized. For instance, one or more of the following three metrics can be used; however, the claimed subject matter is not so limited.

Metric 1=$(E[X[n]X[n+1]]-E[X[n]]^2)/(E[X^2[n]]-E[X[n]]^2)$

Metric 2=$E[X[n]X[n+1]]/E[X^2[n]]$

Metric 3=$E[(X[n]-X[n+1])^2]/E[X[n]]^2$

The expectations can be calculated using the IIR filter with coefficient $\alpha$, for example. Moreover, according to another example, metric 2 can be leveraged by speed estimator 206 and/or CQI filter 302; however, the claimed subject matter is not so limited.

Moreover, CQI report generator 210 can quantize the CQI reports. For instance, 4 bit CQI quantization can be leveraged (e.g. CQI quantization may not significantly impact speed estimation, losses can be in tune with quantization loss, Further, finer quantization can be utilized for lower geometries; however, it is to be appreciated that substantially uniform quantization can be used.

Pursuant to another illustration, the speed estimation yielded by speed estimator 206 can additionally or alternatively be employed for rate prediction, etc. For instance, when speed estimator 206 identifies access terminal 204 to be moving slowly, an instantaneous CQI report can be used by base station 202 (e.g., by a rate selector (not shown) included in base station 202, . . . ) to decide on a rate to be leveraged in connection with access terminal 204. Moreover, when speed estimator 206 recognizes access terminal 204 to be moving quickly, long-term geometry can be utilized by base station 202 (e.g., rate selector, . . . ) to decide on a rate to be employed in connection with access terminal 204. In general, the instantaneous CQI report can reflect channel conditions better when the speed of access terminal 204 is low and the average CQI report (e.g., long-term geometry, . . . ) can reflect channel conditions better when the speed of access terminal 204 is high. Thus, considerations of access terminal speed as determined by speed estimator 206 can be applied for problems that involve using CQI reports to reflect channel quality such as power control, rate selection, and the like.

Figure 4:
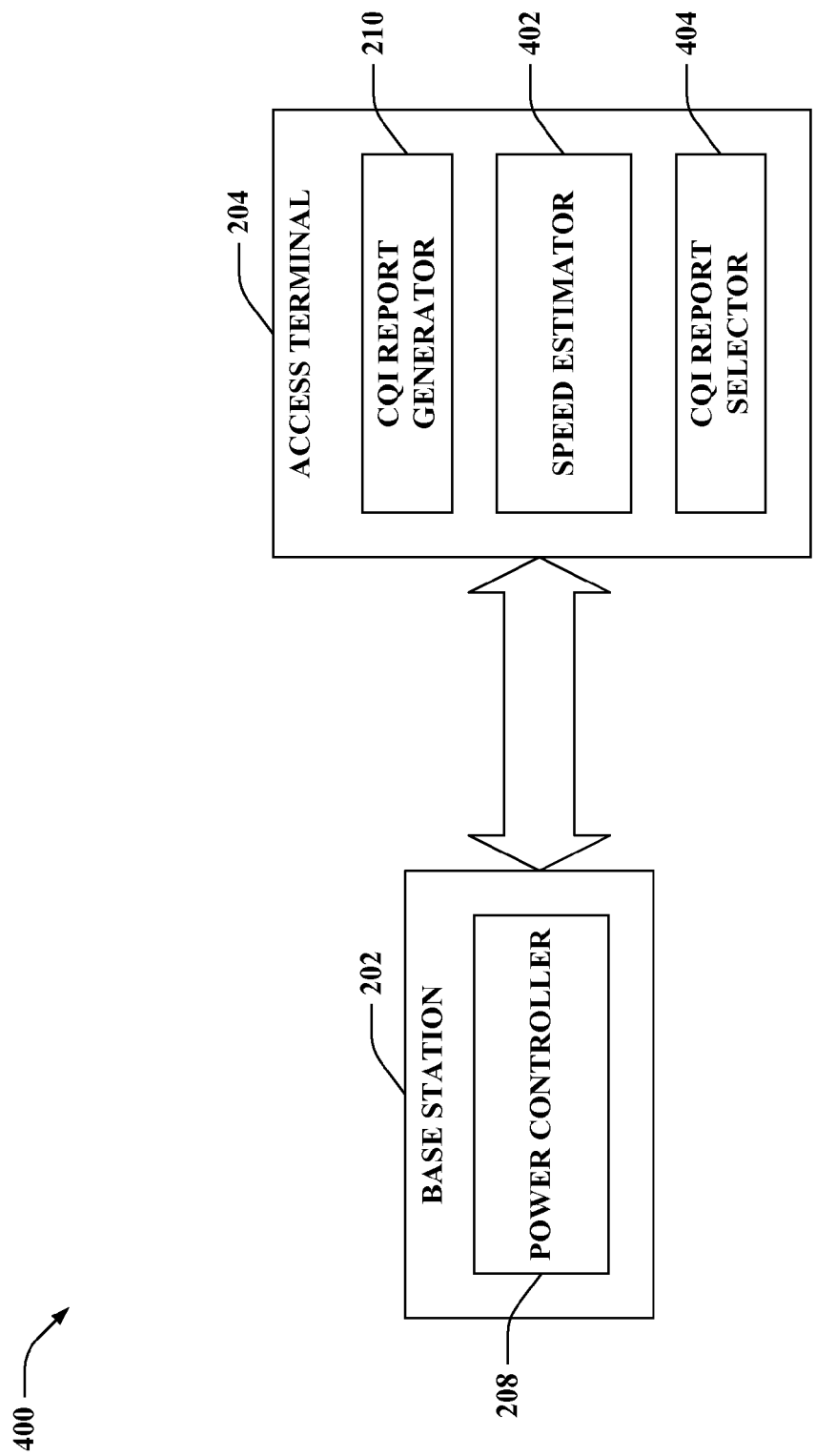
FIG. 4 is an illustration of an example system that leverages considerations of access terminal speed in connection with controlling power in a wireless communication environment.

Now referring to FIG. 4, illustrated is a system 400 that leverages considerations of access terminal speed in connection with controlling power in a wireless communication environment. System 400 includes base station 202 and access terminal 204. According to the example illustrated in system 400, base station 202 can further include power controller 208 and access terminal 204 can further include CQI report generator 210 as described herein. Moreover, access terminal 204 can include a speed estimator 402 and a CQI report selector 404.

According to an illustration, speed estimator 402 (associated with access terminal 204) can be substantially similar to speed estimator 206 of FIG. 2 (associated with base station 202). CQI report generator 210 can yield instantaneous CQI reports (e.g., based upon received pilots, . . . ) and these CQI reports can be averaged over time. Further, by way of example, speed estimator 402 can utilize the speed estimation techniques as described above to determine a speed of access terminal 204 as a function of the CQI reports. If speed estimator 402 recognizes access terminal 204 to be traversing at a high speed, then CQI report selector 404 can choose to transfer the average CQI report yielded by CQI report generator 210 over a period of time. Thereafter, the average CQI report can be sent from access terminal 204 to base station 202, and power controller 208 can utilize the average CQI report to select a transmit power as described herein. Further, if speed estimator 402 determines that access terminal 204 is moving slowly or is stationary, then CQI report selector 404 can choose to transmit the instantaneous CQI report generated by CQI report generator 210. The instantaneous CQI report can be a latest available CQI report yielded by CQI report generator 210, for example. Thus, the instantaneous CQI report can be transmitted from access terminal 204 to base station 202, and power controller 208 can employ the instantaneous CQI report to control a transmit power as described herein. By including speed estimator 402 and CQI report selector 404 in access terminal 204, preprocessing of CQI reports yielded by CQI report generator 210 can be effectuated such that an appropriate CQI report (e.g., instantaneous, average, . . . ) is transmitted to base station 202 as a function of access terminal speed.

Figure 5:
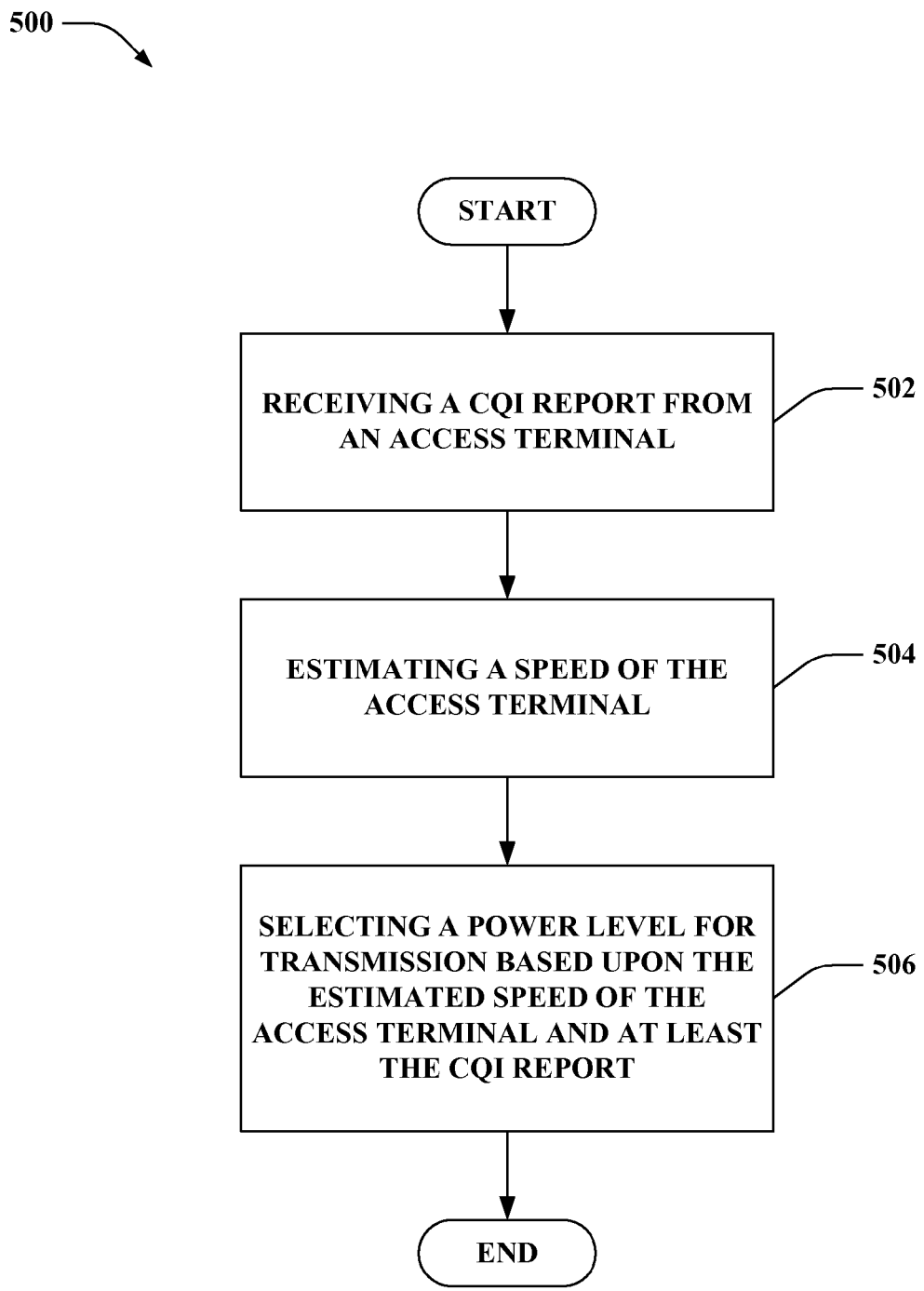
FIG. 5 is an illustration of an example methodology that facilitates controlling power in a wireless communication environment.
Figure 6:
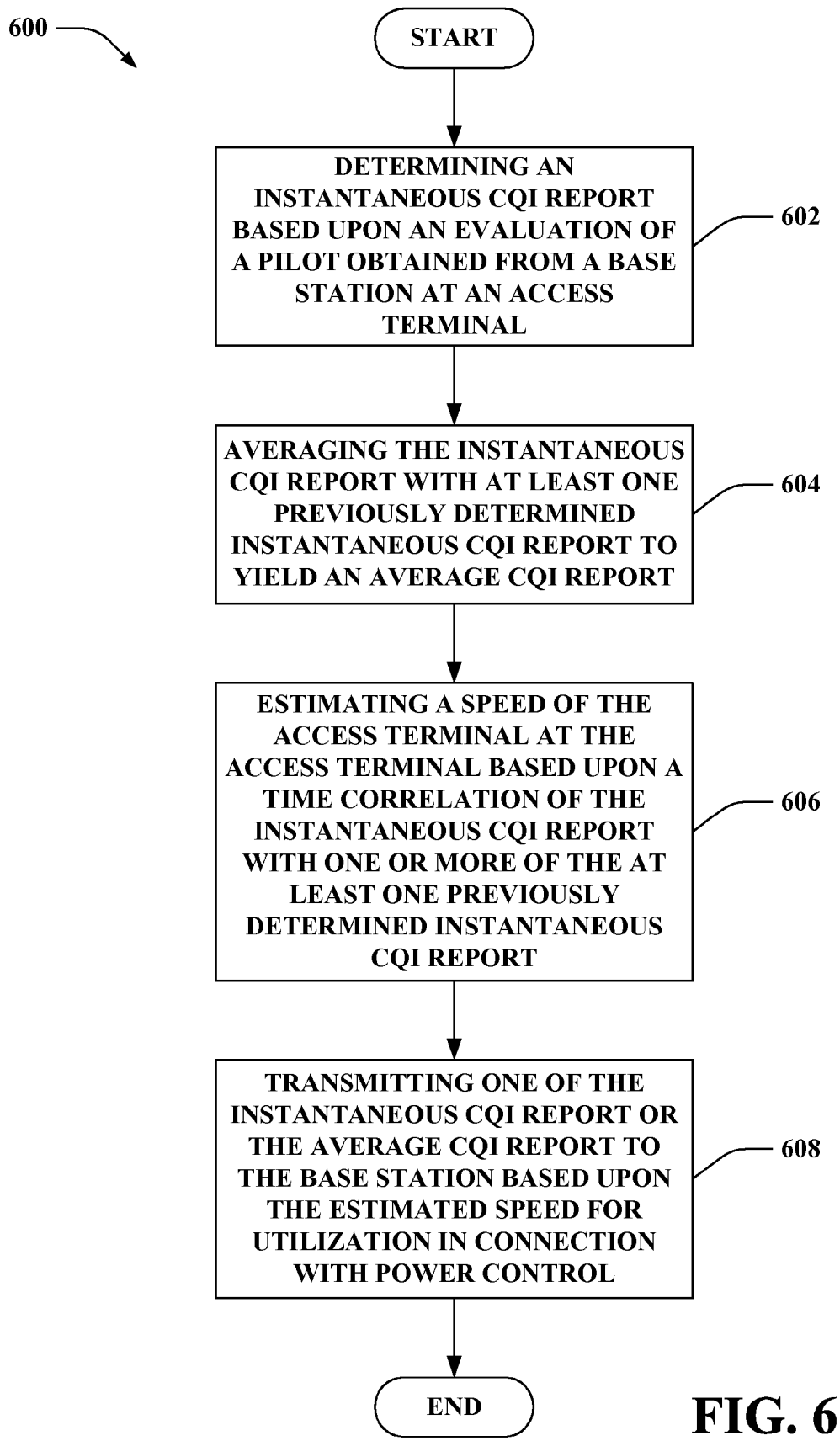
FIG. 6 is an illustration of an example methodology that facilitates reporting CQI values as a function of estimated speed in a wireless communication environment.

Referring to FIGS. 5-6, methodologies relating to employing speed estimation for power control in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 5, illustrated is a methodology 500 that facilitates controlling power in a wireless communication environment. At 502, a CQI report can be received from an access terminal. For instance, the CQI report can be part of a sequence of CQI reports obtained from the access terminal, where each of the CQI reports in the sequence can be obtained periodically or nonperiodically. Moreover, the CQI report can include a quantized value corresponding to average carrier/average interference (avgC/avgI) for a frame computed by the access terminal (e.g., where 1 frame out of every 8 frames can be reported by the access terminal, . . . ). At 504, a speed of the access terminal can be estimated. For instance, the speed of the access terminal can be estimated based upon a time correlation of the CQI report with a disparate CQI report previously received from the access terminal. Additionally or alternatively, the speed of the access terminal can be estimated based upon a reverse link pilot channel, a disparate report from the access terminal, etc. By way of further example, the CQI report can be evaluated utilizing an infinite impulse response (IIR) filter to compute a normalized correlation. Further, when the normalized correlation is below a threshold, then the access terminal can be determined to be moving quickly (e.g., due to fast changes in CQI values over time, . . . ). Moreover, when the normalized correlation is above the threshold, then the access terminal can be determined to be moving slowly and/or stationary (e.g., due to slow and/or no changes in CQI values over time, . . . ). At 506, a power level for transmission can be selected based upon the estimated speed of the access terminal and at least the CQI report. For instance, the power level can be determined as a function of a power control algorithm that can be based on long-term geometry (e.g., function of an average of CQI reports over a period of time, . . . ) when the access terminal is estimated to be quickly moving and the power level can be determined as a function of a power control algorithm that can be based on a latest non-erased CQI report (e.g., instantaneous CQI report, . . . ) when the access terminal is estimated to be slowly moving and/or stationary. By way of example, when the access terminal is estimated to be moving quickly, the power level for transmission can be determined through channel inversion based upon the average of the CQI reports over a period of time (e.g., the average of the CQI reports can be generated from the CQI reports received at the base station). Pursuant to a further example, when the access terminal is estimated to be moving slowly and/or stationary, the power level for transmission can be determined through channel inversion based upon the instantaneous CQI report.

Now turning to FIG. 6, illustrated is a methodology 600 that facilitates reporting CQI values as a function of estimated speed in a wireless communication environment. At 602, an instantaneous CQI report can be determined based upon an evaluation of a pilot obtained from a base station at an access terminal. For example, the instantaneous CQI report can include a computed value of average carrier/average interference (avgC/avgI) for a frame (e.g., where such value can be computed for 1 frame out of every 8 frames, . . . ). At 604, the instantaneous CQI report can be averaged with at least one previously determined instantaneous CQI report to yield an average CQI report. At 606, a speed of the access terminal can be estimated at the access terminal based upon a time correlation of the instantaneous CQI report with one or more of the at least one previously determined instantaneous CQI report. By way of example, the CQI reports can be evaluated utilizing an infinite impulse response (IIR) filter to compute a normalized correlation. Further, when the normalized correlation is below a threshold, then an access terminal can be determined to be moving quickly (e.g., due to fast changes in CQI values over time, . . . ). Moreover, when the normalized correlation is above the threshold, then the access terminal can be determined to be moving slowly and/or stationary (e.g., due to slow and/or no changes in CQI values over time, . . . ). At 608, one of the instantaneous CQI report or the average CQI report can be transmitted to the base station based upon the estimated speed for utilization in connection with power control. For example, the instantaneous CQI report can be transmitted when the access terminal is estimated to be moving slowly or stationary and the average CQI report can be transmitted when the access terminal is estimated to be moving quickly.

It will be appreciated that, in accordance with one or more aspects described herein, inferences can be made regarding evaluating CQI reports to determine access terminal speed and leveraging such determined speed for selecting a power control algorithm in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining a speed of an access terminal based upon CQI report(s). By way of further illustration, an inference can be made related to determining a power control algorithm to employ for an access terminal based upon an estimated speed of the access terminal. It will be appreciated that the foregoing examples are illustrative in nature and are not intended to limit the number of inferences that can be made or the manner in which such inferences are made in conjunction with the various embodiments and/or methods described herein.

Figure 7:
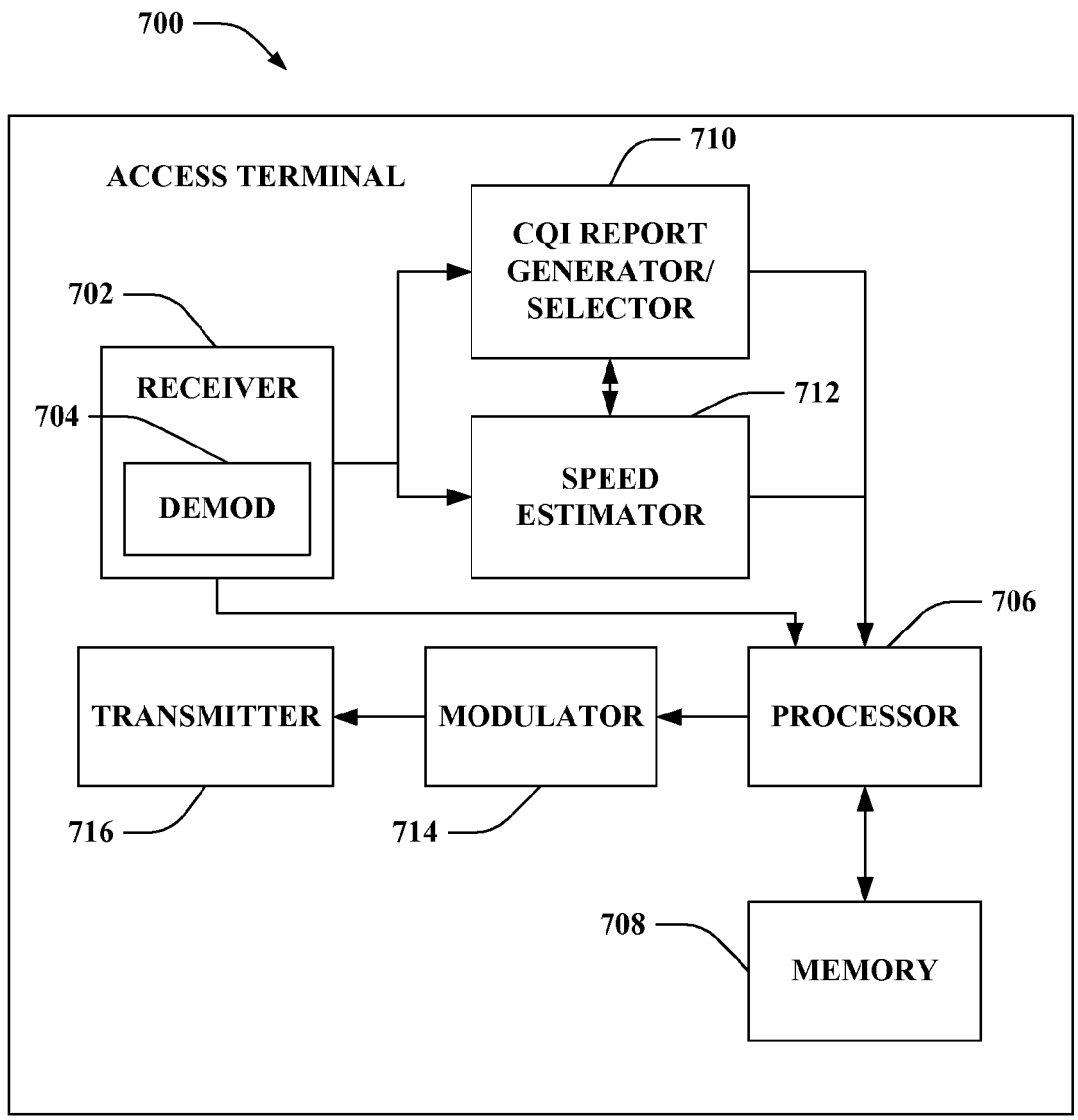
FIG. 7 is an illustration of an example access terminal that employs speed estimation based on CQI reports for utilization in connection with power control in a wireless communication system.

FIG. 7 is an illustration of an access terminal 700 that employs speed estimation based on CQI reports for utilization in connection with power control in a wireless communication system. Access terminal 700 comprises a receiver 702 that receives a signal from, for instance, a receive antenna (not shown), and performs typical actions thereon (e.g., filters, amplifies, downconverts, etc.) the received signal and digitizes the conditioned signal to obtain samples. Receiver 702 can be, for example, an MMSE receiver, and can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of access terminal 700, and/or a processor that both analyzes information received by receiver 702, generates information for transmission by transmitter 716, and controls one or more components of access terminal 700.

Access terminal 700 can additionally comprise memory 708 that is operatively coupled to processor 706 and that can store data to be transmitted, received data, and any other suitable information related to performing the various actions and functions set forth herein. Memory 708 can additionally store protocols and/or algorithms associated with generating reports (e.g., CQI reports, . . . ) for transmission to a base station, selecting reports for transmission (e.g., average versus instantaneous CQI reports, . . . ) and/or estimating a speed of access terminal 700 based upon the generated reports.

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Receiver 702 is further operatively coupled to a CQI report generator/selector 710 and/or a speed estimator 712. CQI report generator/selector 710 can evaluate conditions, parameters, etc. associated with a channel to yield CQI report(s) that can be sent to a base station. According to an example, CQI report generator/selector 710 can yield instantaneous CQI reports, which can thereafter be transmitted to the base station. By way of another example, CQI report generator/selector 710 can yield the instantaneous CQI reports and average the instantaneous CQI reports over periods of time to generate average CQI reports. Following this example, CQI report generator/selector 710 can choose whether to transmit the instantaneous CQI report or the average CQI report at a given time based upon a speed of access terminal 700. Further, speed estimator 712 can estimate the speed of access terminal 700 based upon a time correlation analysis of the CQI reports yielded by CQI report generator/selector 710. The transmitted CQI report (e.g., instantaneous CQI report, average CQI report, . . . ) can thereafter be employed by the base station in connection with power control. It is contemplated that CQI report generator/selector 710 can be substantially similar to CQI report generator 210 of FIG. 2 and/or CQI report selector 404 of FIG. 4. Moreover, it is contemplated that speed estimator 712 can be substantially similar to speed estimator 402 of FIG. 4. Access terminal 700 still further comprises a modulator 714 and a transmitter 716 that transmits the signal to, for instance, a base station, another access terminal, etc. Although depicted as being separate from the processor 706, it is to be appreciated that CQI report generator/selector 710, speed estimator 712 and/or modulator 714 can be part of processor 706 or a number of processors (not shown).

Figure 8:
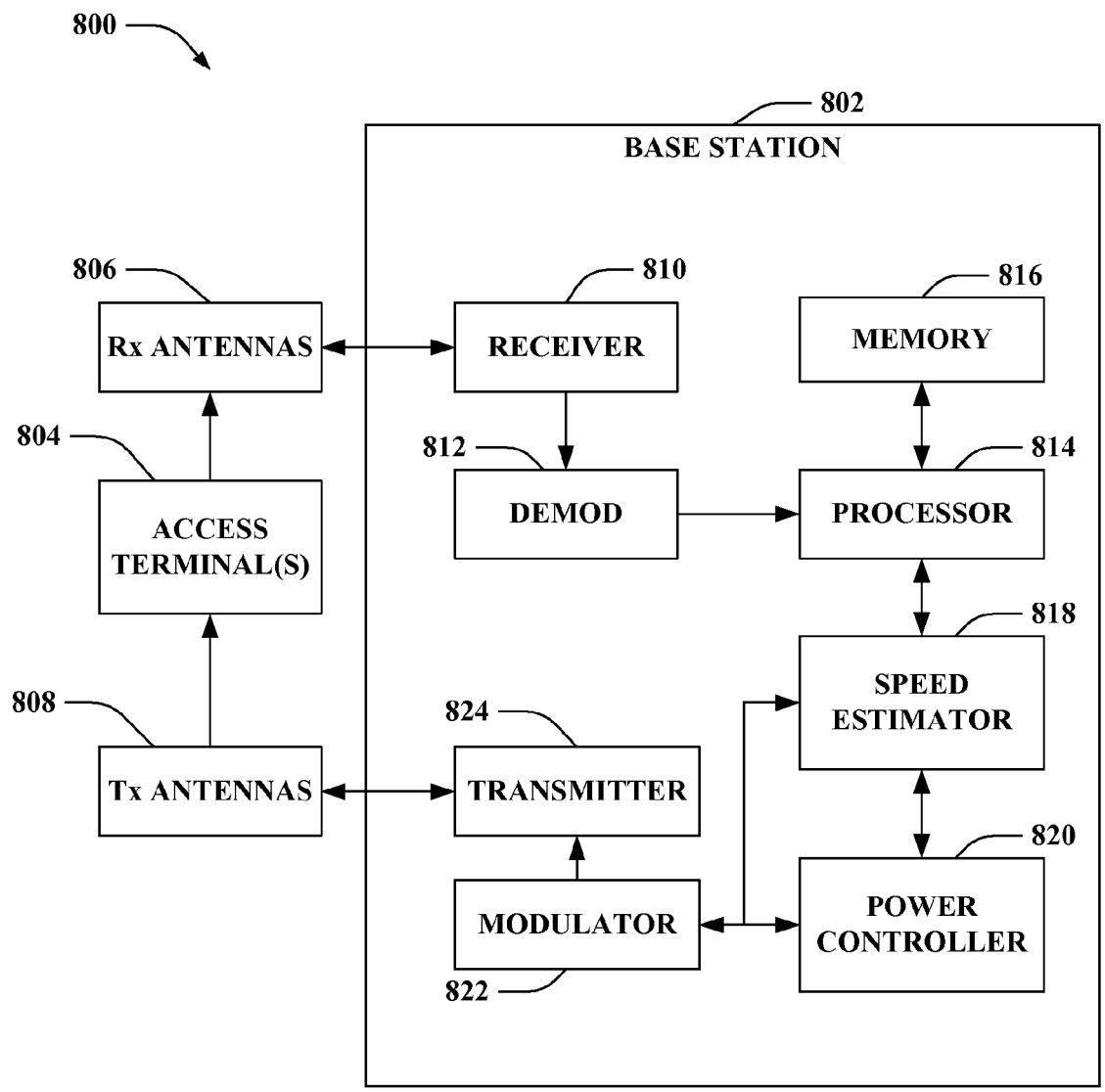
FIG. 8 is an illustration of an example system that employs power control based upon estimated access terminal speed in a wireless communication environment.

FIG. 8 is an illustration of a system 800 that employs power control based upon estimated access terminal speed in a wireless communication environment. System 800 comprises a base station 802 (e.g., access point, . . . ) with a receiver 810 that receives signal(s) from one or more access terminals 804 through a plurality of receive antennas 806, and a transmitter 824 that transmits to the one or more access terminals 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores data to be transmitted to or received from access terminal(s) 804 (or a disparate base station (not shown)) and/or any other suitable information related to performing the various actions and functions set forth herein. For instance, memory 816 can include instructions related to estimating access terminal speed as a function of received CQI reports as described herein. Processor 814 is further coupled to a speed estimator 818 that determines a speed of a given access terminal based upon a time correlation of CQI values received from such access terminal. For instance, speed estimator 818 can recognize that the given access terminal is quickly moving or slowly moving (e.g. stationary, . . . ) based upon variations in the received CQI values over time. Speed estimator 818 can be operatively coupled to a power controller 820 that selects a power control algorithm to utilize for the given access terminal based upon the speed as determined by speed estimator 818. Further, power controller 820 can utilize the selected power control algorithm for sending a downlink transmission to the given access terminal. It is contemplated that speed estimator 818 can be substantially similar to speed estimator 206 of FIG. 2 and/or power controller 820 can be substantially similar to power controller 208 of FIG. 2. Moreover, power controller 820 can set power levels to be utilized when sending data. Modulator 822 can multiplex a frame for transmission by a transmitter 824 through antennas 808 to access terminal(s) 804. Although depicted as being separate from the processor 814, it is to be appreciated that speed estimator 818, power controller 820 and/or modulator 822 can be part of processor 814 or a number of processors (not shown).

Figure 9:
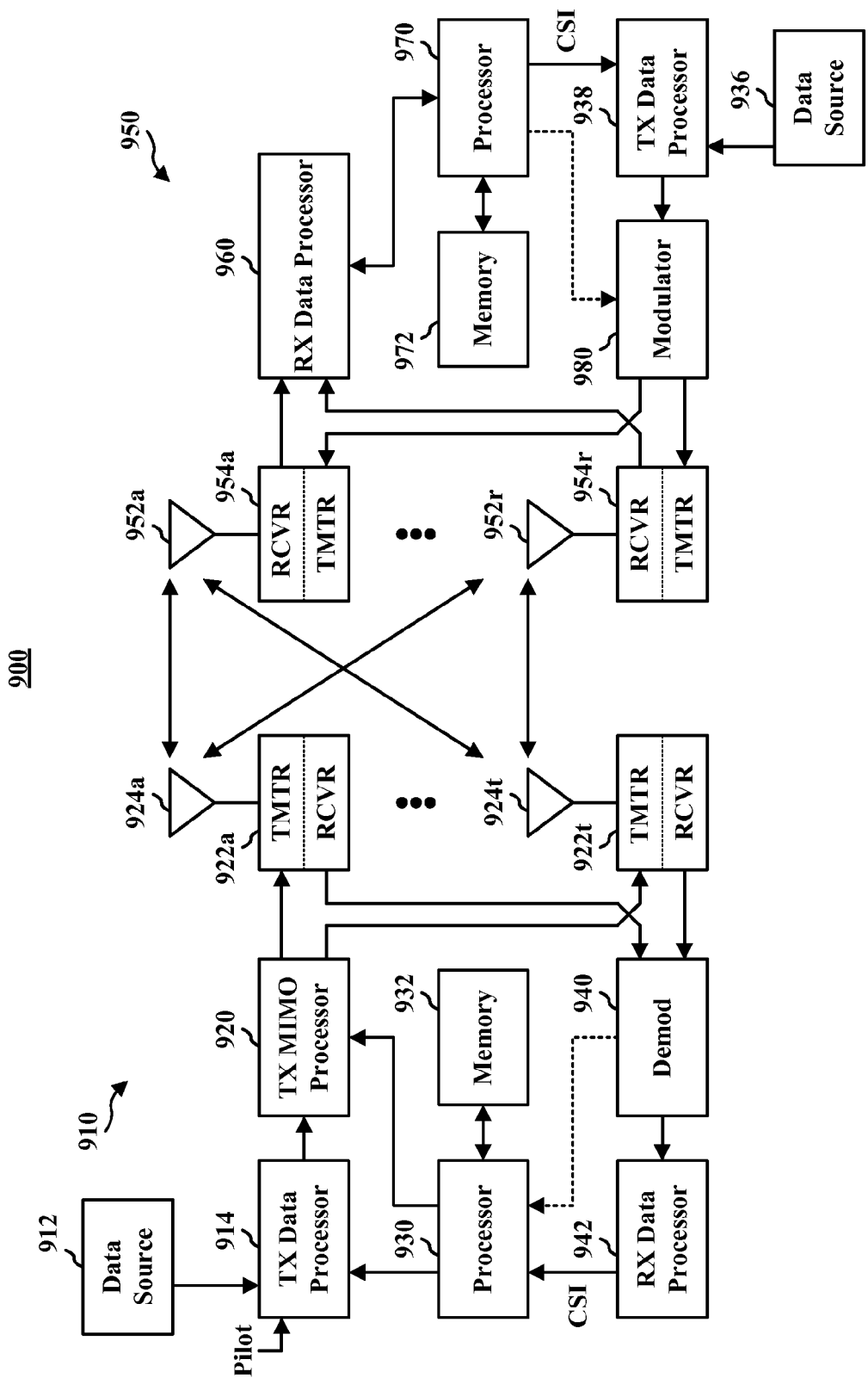
FIG. 9 is an illustration of an example wireless network environment that can be employed in conjunction with the various systems and methods described herein.

FIG. 9 shows an example wireless communication system 900. The wireless communication system 900 depicts one base station 910 and one access terminal 950 for sake of brevity. However, it is to be appreciated that system 900 can include more than one base station and/or more than one access terminal, wherein additional base stations and/or access terminals can be substantially similar or different from example base station 910 and access terminal 950 described below. In addition, it is to be appreciated that base station 910 and/or access terminal 950 can employ the systems (FIGS. 1-4, 7-8, and 10-11) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 950 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At access terminal 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which available technology to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from access terminal 950 are received by antennas 924, conditioned by receivers 922, demodulated by a demodulator 940, and processed by a RX data processor 942 to extract the reverse link message transmitted by access terminal 950. Further, processor 930 can process the extracted message to determine which preceding matrix to use for determining the beamforming weights.

Processors 930 and 970 can direct (e.g., control, coordinate, manage, etc.) operation at base station 910 and access terminal 950, respectively. Respective processors 930 and 970 can be associated with memory 932 and 972 that store program codes and data. Processors 930 and 970 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bidirectional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
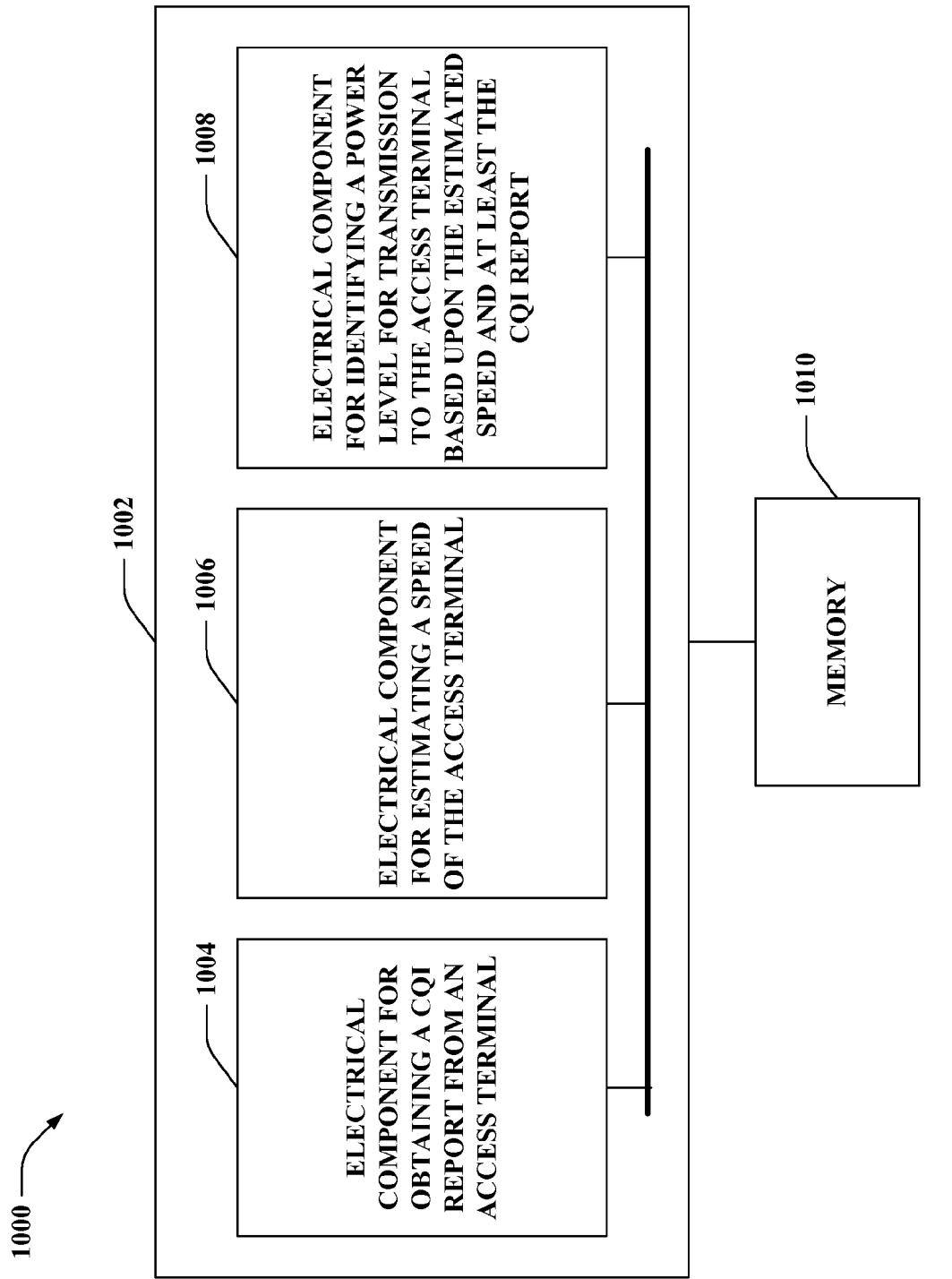
FIG. 10 is an illustration of an example system that enables controlling power based upon considerations of access terminal speed in a wireless communication environment.

With reference to FIG. 10, illustrated is a system 1000 that enables controlling power based upon considerations of access terminal speed in a wireless communication environment. For example, system 1000 can reside at least partially within a base station. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for obtaining a CQI report from an access terminal 1004. Further, logical grouping 1002 can include an electrical component for estimating a speed of the access terminal 1006. For instance, logical grouping 1002 can include an electrical component (not shown) for estimating the speed of the access terminal based upon a time correlation of the CQI report with at least one previously received CQI report from the access terminal. Moreover, logical grouping 1002 can include an electrical component for identifying a power level for transmission to the access terminal based upon the estimated speed and at least the CQI report 1008. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
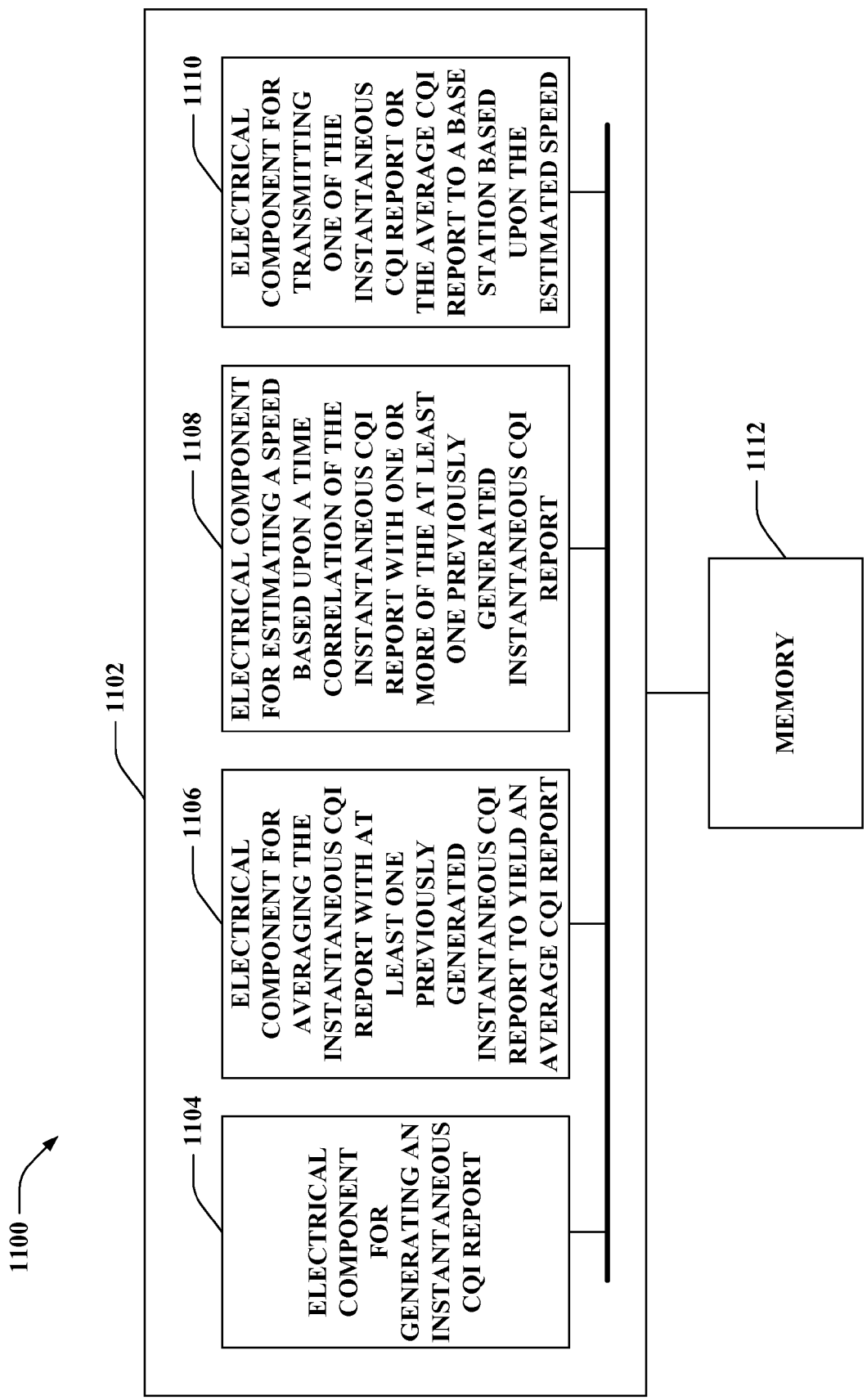
FIG. 11 is an illustration of an example system that enables selecting a CQI report to send to a base station as a function of access terminal speed for utilization in connection with power control in a wireless communication environment.

With reference to FIG. 11, illustrated is a system 1100 that enables selecting a CQI report to send to a base station as a function of access terminal speed for utilization in connection with power control in a wireless communication environment. For example, system 1100 can reside within an access terminal. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for generating an instantaneous CQI report 1104. Further, logical grouping 1102 can include an electrical component for averaging the instantaneous CQI report with at least one previously generated instantaneous CQI report to yield an average CQI report 1106. Moreover, logical grouping 1102 can comprise an electrical component for estimating a speed based upon a time correlation of the instantaneous CQI report with one or more of the at least one previously generated instantaneous CQI report 1108. Logical grouping 1102 can also include an electrical component for transmitting one of the instantaneous CQI report or the average CQI report to a base station based upon the estimated speed 1110. The transmitted one of the instantaneous CQI report or the average CQI report can be utilized by the base station for effectuating power control. Additionally, system 1100 can include a memory 1112 that retains instructions for executing functions associated with electrical components 1104, 1106, 1108, and 1110. While shown as being external to memory 1112, it is to be understood that one or more of electrical components 1104, 1106, 1108, and 1110 can exist within memory 1112.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates controlling power in a wireless communication environment, comprising:
   receiving a Channel Quality Indicator (CQI) report from an access terminal;
   estimating a speed of the access terminal based upon a time correlation of the CQI report with a disparate CQI report previously received from the access terminal; and
   selecting a power level for transmission based upon the estimated speed of the access terminal and at least the CQI report.

2. The method of claim 1, wherein the CQI report is part of a sequence of CQI reports, each of the CQI reports in the sequence being obtained periodically from the access terminal.

3. The method of claim 1, wherein the CQI report is part of a sequence of CQI reports, each of the CQI reports in the sequence being obtained nonperiodically from the access terminal.

4. The method of claim 1, wherein the CQI report includes a quantized value corresponding to average carrier/average interference (avgC/avgI) for a frame computed by the access terminal.

5. The method of claim 1, further comprising evaluating the CQI report utilizing an infinite impulse response (IIR) filter to compute a normalized correlation.

6. The method of claim 5, further comprising:
   determining that the access terminal is moving slowly or is stationary when the normalized correlation is above a threshold; and
   determining that the access terminal is moving quickly when the normalized correlation is below the threshold.

7. A method that facilitates controlling power in a wireless communication environment, comprising:
   receiving a Channel Quality Indicator (CQI) report from an access terminal;
   estimating a speed of the access terminal;
   selecting a power level for transmission based upon the estimated speed of the access terminal and at least the CQI report;
   selecting the power level for transmission by utilizing a first power control algorithm based on long-term geometry when the access terminal is estimated to be moving quickly; and
   selecting the power level for transmission by utilizing a second power control algorithm based on a latest non-erased CQI report when the access terminal is estimated to be moving slowly or stationary.

8. A method that facilitates controlling power in a wireless communication environment, comprising:
   receiving a Channel Quality Indicator (CQI) report from an access terminal;
   estimating a speed of the access terminal;
   selecting a power level for transmission based upon the estimated speed of the access terminal and at least the CQI report;
   determining the power level for transmission through channel inversion based upon an average of CQI reports over a period of time when the access terminal is estimated to be moving quickly; and
   determining the power level for transmission through channel inversion based upon an instantaneous CQI report when the access terminal is estimated to be moving slowly or stationary.

9. A wireless communications apparatus, comprising:
   a memory that retains instructions related to obtaining Channel Quality Indicator (CQI) report from an access terminal, estimating a speed of the access terminal based upon a time correlation of the CQI report with a disparate CQI report previously received from the access terminal, and selecting a power level for transmission based upon the estimated speed of the access terminal and at least the CQI report; and
   a processor, coupled to the memory, configured to execute the instructions retained in the memory.

10. The wireless communications apparatus of claim 9, wherein the CQI report is included in a sequence of CQI reports, each of the CQI reports in the sequence being obtained periodically from the access terminal.

11. The wireless communications apparatus of claim 9, wherein the CQI report is included in a sequence of CQI reports, each of the CQI reports in the sequence being obtained nonperiodically from the access terminal.

12. The wireless communications apparatus of claim 9, wherein the CQI report includes a quantized value corresponding to average carrier/average interference (avgC/avgI) for a frame computed by the access terminal.

13. The wireless communications apparatus of claim 9, wherein the memory further retains instructions related to analyzing the CQI report utilizing an infinite impulse response (IIR) filter to compute a normalized correlation.

14. The wireless communications apparatus of claim 13, wherein the memory further retains instructions related to determining that the access terminal is moving slowly or is stationary when the normalized correlation is above a threshold and determining that the access terminal is moving quickly when the normalized correlation is below the threshold.

15. A wireless communications apparatus, comprising:
   a memory that retains instructions related to obtaining Channel Quality Indicator (CQI) report from an access terminal, estimating a speed of the access terminal, selecting a power level for transmission based upon the estimated speed of the access terminal and at least the CQI report, selecting the power level by employing a first power control algorithm based on long-term geometry when the access terminal is estimated to be moving quickly, and selecting the power level by employing a second power control algorithm based on a latest non-erased CQI report when the access terminal is estimated to be moving slowly or stationary; and
a processor, coupled to the memory, configured to execute the instructions retained in the memory.

16. A wireless communications apparatus, comprising:
a memory that retains instructions related to obtaining Channel Quality Indicator (CQI) report from an access terminal, estimating a speed of the access terminal, selecting a power level for transmission based upon the estimated speed of the access terminal and at least the CQI report, determining the power level for transmission through channel inversion based upon an average of CQI reports over a period of time when the access terminal is estimated to be moving quickly, and determining the power level for transmission through channel inversion based upon an instantaneous CQI report when the access terminal is estimated to be moving slowly or stationary; and
a processor, coupled to the memory, configured to execute the instructions retained in the memory.

17. A wireless communications apparatus that enables controlling power based upon considerations of access terminal speed in a wireless communication environment, comprising:
means for obtaining a CQI report from an access terminal;
means for estimating a speed of the access terminal based upon a time correlation of the CQI report with a disparate CQI report previously received from the access terminal; and
means for identifying a power level for transmission to the access terminal based upon the estimated speed and at least the CQI report.

18. The wireless communications apparatus of claim 17, wherein the CQI report is included in a sequence of CQI reports, each of the CQI reports in the sequence being obtained periodically from the access terminal.

19. The wireless communications apparatus of claim 17, wherein the CQI report is included in a sequence of CQI reports, each of the CQI reports in the sequence being obtained nonperiodically from the access terminal.

20. The wireless communications apparatus of claim 17, wherein the CQI report includes a quantized value corresponding to average carrier/average interference (avgC/avgI) for a frame computed by the access terminal.

21. The wireless communications apparatus of claim 17, further comprising:
means for computing a normalized correlation; and
means for recognizing the access terminal to be moving slowly or stationary when the normalized correlation is above a threshold and moving quickly when the normalized correlation is below the threshold.

22. A wireless communications apparatus that enables controlling power based upon considerations of access terminal speed in a wireless communication environment, comprising:
means for obtaining a CQI report from an access terminal;
means for estimating a speed of the access terminal; and
means for identifying a power level for transmission to the access terminal based upon the estimated speed and at least the CQI report, wherein a first power control algorithm based on long-term geometry is identified to be utilized for sending the transmission when the access terminal is estimated to be moving quickly, and a second power control algorithm based on a latest non-erased CQI report is identified to be utilized for sending the downlink transmission when the access terminal is estimated to be moving slowly or stationary.

23. A wireless communications apparatus that enables controlling power based upon considerations of access terminal speed in a wireless communication environment, comprising:
means for obtaining a CQI report from an access terminal;
means for estimating a speed of the access terminal; and
means for identifying a power level for transmission to the access terminal based upon the estimated speed and at least the CQI report, wherein the power level for transmission is determined based upon a power control algorithm that includes channel inversion based upon an average of CQI reports over a period of time when the access terminal is estimated to be moving quickly, and the power level for transmission is determined based upon a power control algorithm that includes channel inversion based upon an instantaneous CQI report when the access terminal is estimated to be moving slowly or stationary.

24. A non-transitory computer program product, comprising:
a computer-readable medium comprising:
code for receiving a Channel Quality Indicator (CQI) report from an access terminal;
code for estimating a speed of the access terminal based upon a time correlation of the CQI report with a disparate CQI report previously received from the access terminal; and
code for selecting a power level for transmission based upon the estimated speed of the access terminal and at least the CQI report.

25. The non-transitory computer program product of claim 24, wherein the CQI report is part of a sequence of CQI reports, each of the CQI reports in the sequence being obtained periodically from the access terminal.

26. The non-transitory computer program product of claim 24, wherein the CQI report is part of a sequence of CQI reports, each of the CQI reports in the sequence being obtained nonperiodically from the access terminal.

27. The non-transitory computer program product of claim 24, wherein the CQI report includes a quantized value corresponding to average carrier/average interference (avgC/avgI) for a frame computed by the access terminal.

28. The non-transitory computer program product of claim 24, wherein the computer-readable medium further comprises code for evaluating the CQI report utilizing an infinite impulse response (IIR) filter to compute a normalized correlation and comparing the normalized correlation to a threshold.

29. A non-transitory computer program product, comprising:
a computer-readable medium comprising:
code for receiving a Channel Quality Indicator (CQI) report from an access terminal;
code for estimating a speed of the access terminal;
code for selecting a power level for transmission based upon the estimated speed of the access terminal and at least the CQI report;
code for selecting the power level for transmission as a function of a first power control algorithm based on long-term geometry when the access terminal is estimated to be moving quickly; and
code for selecting the power level for transmission as a function of a second power control algorithm based on a latest non-erased CQI report when the access terminal is estimated to be moving slowly or stationary.

30. A method that facilitates reporting CQI values as a function of estimated speed in a wireless communication environment, comprising:
   determining an instantaneous CQI report based upon an evaluation of a pilot obtained from a base station at an access terminal;
   averaging the instantaneous CQI report with at least one previously determined instantaneous CQI report to yield an average CQI report;
   estimating a speed of the access terminal at the access terminal based upon a time correlation of the instantaneous CQI report with one or more of the at least one previously determined instantaneous CQI report; and
   transmitting one of the instantaneous CQI report or the average CQI report to the base station based upon the estimated speed for utilization in connection with power control.

31. The method of claim 30, wherein the instantaneous CQI report includes a computed value of average carrier/average interference (avgC/avgI) for a frame.

32. The method of claim 30, further comprising evaluating the instantaneous CQI report utilizing a filter to compute a normalized correlation.

33. The method of claim 32, further comprising:
   determining that the access terminal is moving slowly or is stationary when the normalized correlation is above a threshold; and
   determining that the access terminal is moving quickly when the normalized correlation is below the threshold.

34. The method of claim 30, further comprising:
   transmitting the instantaneous CQI report when the access terminal is estimated to be moving slowly or stationary; and
   transmitting the average CQI report when the access terminal is estimated to be moving quickly.

35. A wireless communications apparatus, comprising:
   a memory that retains instructions related to determining an instantaneous CQI report based upon an evaluation of a pilot obtained from a base station at an access terminal, averaging the instantaneous CQI report with at least one previously determined instantaneous CQI report to yield an average CQI report, estimating a speed of the access terminal at the access terminal based upon a time correlation of the instantaneous CQI report with one or more of the at least one previously determined instantaneous CQI report, and transmitting one of the instantaneous CQI report or the average CQI report to the base station based upon the estimated speed for utilization in connection with power control; and
   a processor, coupled to the memory, configured to execute the instructions retained in the memory.

36. The wireless communications apparatus of claim 35, wherein the instantaneous CQI report includes a computed value of average carrier/average interference (avgC/avgI) for a frame.

37. The wireless communications apparatus of claim 35, wherein the memory further retains instructions related to evaluating the instantaneous CQI report utilizing a filter to compute a normalized correlation.

38. The wireless communications apparatus of claim 37, wherein the memory further retains instructions related to determining that the access terminal is moving slowly or is stationary when the normalized correlation is above a threshold and determining that the access terminal is moving quickly when the normalized correlation is below the threshold.

39. The wireless communications apparatus of claim 35, wherein the memory further retains instructions related to transmitting the instantaneous CQI report when the access terminal is estimated to be moving slowly or stationary and transmitting the average CQI report when the access terminal is estimated to be moving quickly.

40. A wireless communications apparatus that enables selecting a CQI report to send to a base station as a function of access terminal speed for utilization in connection with power control in a wireless communication environment, comprising:
   means for generating an instantaneous CQI report;
   means for averaging the instantaneous CQI report with at least one previously generated instantaneous CQI report to yield an average CQI report;
   means for estimating a speed based upon a time correlation of the instantaneous CQI report with one or more of the at least one previously generated instantaneous CQI report; and
   means for transmitting one of the instantaneous CQI report or the average CQI report to a base station based upon the estimated speed.

41. The wireless communications apparatus of claim 40, wherein the instantaneous CQI report includes a computed value of average carrier/average interference (avgC/avgI) for a frame.

42. The wireless communications apparatus of claim 40, further comprising means for comparing a normalized correlation, computed based at least in part upon the instantaneous CQI report, to a threshold to estimate the speed.

43. The wireless communications apparatus of claim 42, wherein the speed is estimated to be slow when the normalized correlation is above the threshold and the speed is estimated to be quick when the normalized correlation is below the threshold.

44. The wireless communications apparatus of claim 40, wherein the instantaneous CQI report is transmitted when the access terminal is estimated to be moving slowly or stationary and the average CQI report is transmitted when the access terminal is estimated to be moving quickly.

45. A non-transitory computer program product, comprising:
   a computer-readable medium comprising:
      code for generating an instantaneous CQI report;
      code for averaging the instantaneous CQI report with at least one previously generated instantaneous CQI report to yield an average CQI report;
      code for estimating a speed based upon a time correlation of the instantaneous CQI report with one or more of the at least one previously generated instantaneous CQI report; and
      code for transmitting one of the instantaneous CQI report or the average CQI report to a base station based upon the estimated speed.

46. The non-transitory computer program product of claim 45, wherein the instantaneous CQI report includes a computed value of average carrier/average interference (avgC/avgI) for a frame.

47. The non-transitory computer program product of claim 45, wherein the computer-readable medium further comprises:
   code for computing a normalized correlation based at least in part upon the instantaneous CQI report; and
   code for comparing the normalized correlation to a threshold to estimate the speed.

48. The non-transitory computer program product of claim 47, wherein the speed is estimated to be slow when the normalized correlation is above the threshold and the speed is estimated to be quick when the normalized correlation is below the threshold.

49. The non-transitory computer program product of claim 45, wherein the instantaneous CQI report is transmitted when the access terminal is estimated to be moving slowly or stationary and the average CQI report is transmitted when the access terminal is estimated to be moving quickly.

50. In a wireless communications system, an apparatus comprising:
   a processor configured to:
      determine an instantaneous CQI report based upon an evaluation of a pilot obtained from a base station at an access terminal;
      average the instantaneous CQI report with at least one previously determined instantaneous CQI report to yield an average CQI report;
      estimate a speed of the access terminal at the access terminal based upon a time correlation of the instantaneous CQI report with one or more of the at least one previously determined instantaneous CQI report; and
      transmit one of the instantaneous CQI report or the average CQI report to the base station based upon the estimated speed for utilization in connection with power control.

* * * * *